United States Patent
Mahmud

(10) Patent No.: US 9,626,159 B2
(45) Date of Patent: Apr. 18, 2017

(54) AUTOMATIC GENERATION OF TASK SCRIPTS FROM WEB BROWSING INTERACTION HISTORY

(75) Inventor: Jalal U. Mahmud, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 13/561,378

(22) Filed: Jul. 30, 2012

(65) Prior Publication Data

US 2012/0290936 A1    Nov. 15, 2012

Related U.S. Application Data

(63) Continuation of application No. 13/016,182, filed on Jan. 28, 2011, now abandoned.

(51) Int. Cl.
G06F 11/34    (2006.01)
G06F 9/44    (2006.01)
G06F 17/30    (2006.01)

(52) U.S. Cl.
CPC .......... *G06F 8/30* (2013.01); *G06F 11/3414* (2013.01); *G06F 17/30873* (2013.01); *G06F 11/3438* (2013.01); *G06F 17/30876* (2013.01)

(58) Field of Classification Search
CPC .......... G06F 17/3089; G06F 17/30861; G06F 17/30867; G06F 11/3414; G06F 11/263; G06F 11/3438; G06F 17/30873; G06F 17/30899
USPC .......................................... 715/733, 736, 811
See application file for complete search history.

(56) References Cited

U.S. PATENT DOCUMENTS

| | | | |
|---|---|---|---|
| 6,957,390 B2 | 10/2005 | Tamir et al. | |
| 7,295,995 B1* | 11/2007 | York et al. | 705/26.8 |
| 7,308,497 B2* | 12/2007 | Louviere et al. | 709/224 |
| 2006/0053126 A1 | 3/2006 | Baca et al. | |
| 2010/0198768 A1 | 8/2010 | Zhou et al. | |

OTHER PUBLICATIONS

Li, I., et al., "Here's what I did: Sharing and Reusing Web Activity with ActionShot". CHI 2010. Apr. 10-15, 2010. pp. 723-732. Copyright 2010 ACM 978-1-60558-929-9/10/04. Atlanta, Georgia.
Mahmud, J., et al., "Csurf: A Context-Driven Non-Visual Web-Browser." WWW 2007 / Track: Browsers and User Interfaces, Session: Smarter Browsing. May 8-12, 2007. pp. 31-40. ACM 9781595936547/07/0005. Banff, Alberta, Canada.

(Continued)

*Primary Examiner* — Jeffrey A Gaffin
*Assistant Examiner* — Rinna Yi
(74) *Attorney, Agent, or Firm* — Fleit Gibbons Gutman Bongini Bianco PL; Thomas S. Grzesik

(57) ABSTRACT

Embodiments of the invention relate to automatically identifying web browsing tasks based on a web browsing interaction history. According to one embodiment of the invention, a web browsing interaction history of a user is analyzed to identify web browsing actions associated with web sites. Abstracted action sequences for the web browsing actions that are identified are generated, and action subsequences for the abstracted action sequences are generated. A similarity between each of the action subsequences is determined, and similar action subsequences are designated as a web browsing task.

17 Claims, 7 Drawing Sheets

(56) References Cited

OTHER PUBLICATIONS

Mahmud, J., et al., "Automated Construction of Web Accessibility Models from Transaction Click-streams". WWW 2009 Madrid: Track: Web Engineering / Session: End User Web Engineering. Apr. 20-24, 2009. pp. 871-880. ACM 978-1-60558-487-4/09/04. Madrid, Spain.

Islam, A.M., et al., "Improving Accessibility of Transaction centric Web Objects", SDM 2010. Apr. 22-24, 2009. pp. 1-12. Columbus, Ohio.

Bigham, J.P., et al., "Trailblazer: Enabling Blind Users to Blaze Trails through the web", Proceedings of the 14th international conference on Intelligent user interfaces, Feb. 8-11, 2009. pp. 177-186. ISBN: 978-1-60558-168-2. Copyright 2009 ACM 978-1-60558-331-0/09/02. Sanibel Island, Florida.

Chickenfoot for Firefox: Rewrite the Web, http://groups.csail.mit.edu/uid/chickenfoot/. Copyright 2004-2008 Massachusetts Institute of Technology. pp. 1-3. Website last visited on Feb. 7, 2014.

Non-Final Office Action dated Oct. 8, 2013 received for U.S. Appl. No. 13/016,182.

Hupp, D., "Smart Bookmarks: Automatic Retroactive Macro Recording on the Web," UIST: Proceedings of the Annual ACM Symposium on User Interface Software and Technology, pp. 81-90; 2007; Proceedings of the $20^{th}$ Annual ACM Symposium on User Interface Software and Technology, UIST 2007.

Leshed, G., et al., "CoScripter: Automating & Sharing How-To Knowledge in the Enterprise," CHI Apr. 5-10, 2008, Florence, Italy; Copying 2008 ACM 978-1-60558-011-1/08/04.

Final Office Action dated May 15, 2014 received for U.S. Appl. No. 13/016,182.

* cited by examiner

AUTOMATIC GENERATION OF TASK SCRIPTS FROM WEB BROWSING INTERACTION HISTORY

CROSS-REFERENCE TO RELATED APPLICATION

This application is continuation of and claims priority from U.S. patent application Ser. No. 13/016,182 filed on Jan. 28, 2011, the entire disclosure is herein incorporated by reference in its entirety.

BACKGROUND

The present invention generally relates to web automaton systems, and more particularly relates to generating automated web browsing scripts.

The World Wide Web has become an integral part of our daily activities. People browse the Web for information (e.g., reading newspapers), to conduct transactions (e.g., buying a book), and so on. Most often the goal of web browsing is to accomplish a task, such as buying a book, checking flight status, or paying a bill. Each such task is a sequence of web actions, such as visiting a website, clicking a link to select a category (e.g., the fiction category on a book seller website), clicking a link to select an item (e.g., a particular book), and clicking a button to add that item to a shopping cart. The execution of the actions on the website accomplishes a goal (e.g., buying the book). Some of these tasks are performed repeatedly by users. Web automaton systems allow users to record scripts while conducting such tasks. The recorded scripts can be saved in a repository and reused at later times. For example, a user can create a script for "buying a book" that can be repeatedly executed later. Such a script is known as a "task-script" because the script accomplishes a task.

BRIEF SUMMARY

One embodiment of the present invention provides a method. According to the method, a web browsing interaction history of a user is analyzed to identify web browsing actions associated with web sites. Abstracted action sequences for the web browsing actions that are identified are generated, and action subsequences for the abstracted action sequences are generated. A similarity between each of the action subsequences is determined, and similar action subsequences are designated as a web browsing task.

Other objects, features, and advantages of the present invention will become apparent from the following detailed description. It should be understood, however, that the detailed description and specific examples, while indicating various embodiments of the present invention, are given by way of illustration only and various modifications may naturally be performed without deviating from the present invention.

DETAILED DESCRIPTION

Various embodiments of the present invention will be discussed in detail herein below with reference to the attached drawings.

Web automaton systems allow users to record scripts while conducting a task. One of the key benefits of such systems is that a user can reuse a script recorded by another user. However, manually creating and sharing scripts has limitations. Most often a user has personalized task needs for which no scripts have been created by other users. For example, a user may regularly visit a travel website to check airline ticket prices, and another user may not have created and shared a script for accomplishing this task. In this situation, the user has to manually create the script. Similarly, if the user frequently checks airline ticket prices on different websites and another user has not created a script for those websites, the user has to create a script for each of the websites in order to reuse them later. Although some conventional web automaton systems facilitate the recording of scripts, this is a labor intensive process. As a result, many users do not record scripts and thus cannot take advantage of conventional web automaton systems.

In some conventional systems, a user can manually select actions from an interaction history in order to create a script. Thus, with such systems, a user does not need to repeat what they have already done. In particular, if the user visited a particular website and performed a task, then the user can later manually inspect their web browsing interaction history, select the actions for which they want to create a script, and create the script. However, a great deal of manual effort is required to find the correct actions in the web browsing interaction history for creating the scripts. And more manual effort is required when the total number of interactions in the browsing history is large. Additionally, such a manual approach is not scalable across websites. The user has to manually create a task script for each of the websites, even though the scripts perform a similar task on the different websites.

Embodiments of the present invention automatically identify personalized tasks from a user's web browsing interaction history. Repeated sequences of similar actions on a single website are identified from the user's web browsing interaction history, and these sequences are labeled as a task. The identification of such tasks assists the creation of task-scripts by a web automaton system, and thus makes task-script generation easier for the user.

Figure 1:
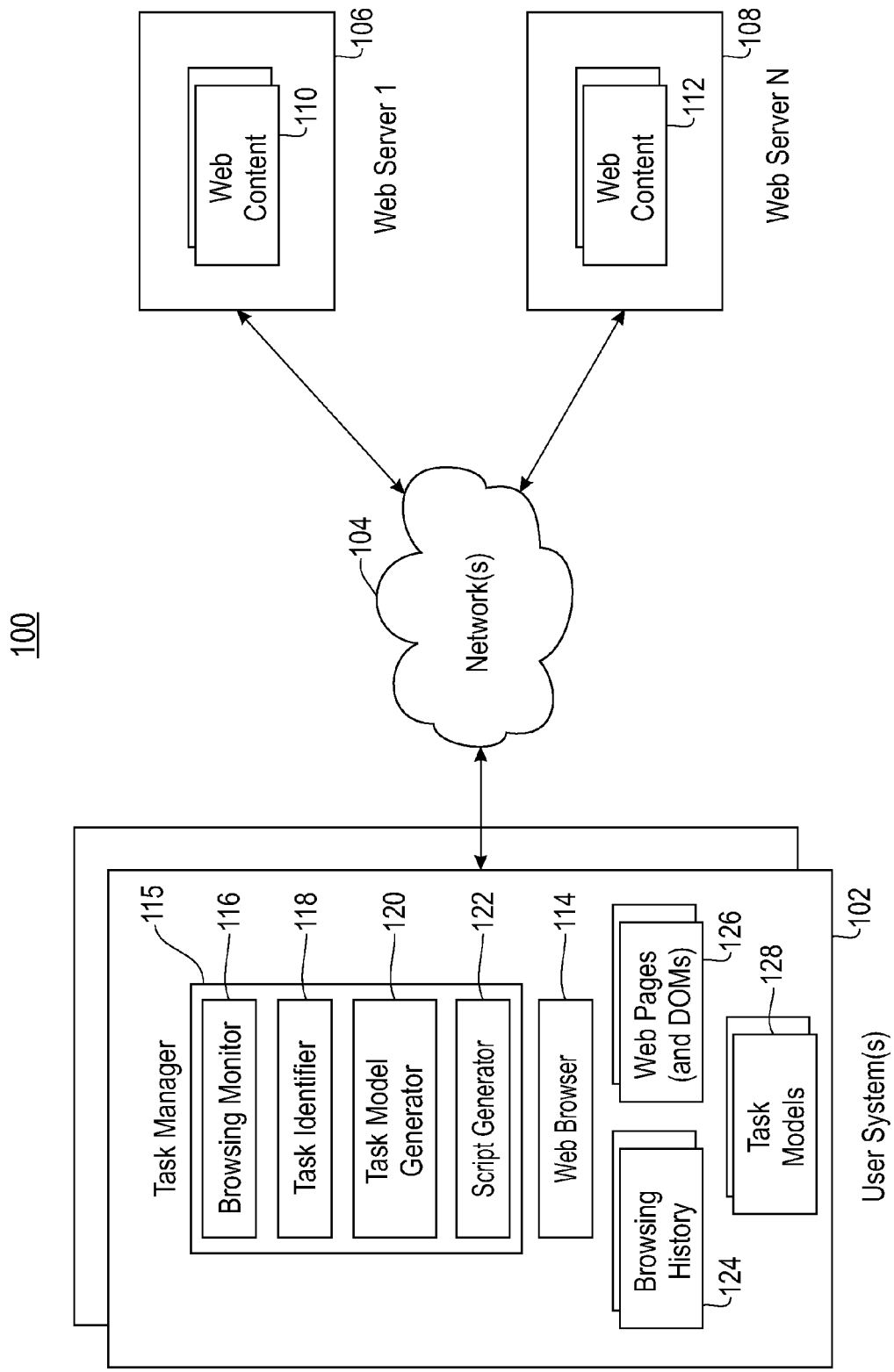
FIG. 1 is a block diagram illustrating an operating environment according to one embodiment of the present invention.

FIG. 1 illustrates an operating environment 100 according to one embodiment of the present invention. As shown, one or more user systems 102 are communicatively coupled to one or more networks 104. Additionally, N web servers 106 and 108 are communicatively coupled to the network(s) 104. The network(s) 104, in this embodiment, is a wide area network, local area network, wired network, wireless network, and/or the like. Each web server 106 and 108 comprises web content 110 and 112 such as websites and their web pages that are accessible by a user of the user system 102 via an application such as a web browser 114.

The user system 102 comprises the web browser 114 and a task management system (task manager) 115. The task manager 115 includes a browsing monitor 116, a task identifier 118, a task model generator 120, and a script generator 122. The user system 102 also comprises browsing history information 124, web pages 126 (and their document object models (DOMs)), and task models 128. In further embodiments, one or more of these components resides outside of the user system 102.

The browsing history monitor 116 monitors the user's browsing history including various actions taken by the user with respect to the web content using the web browser 114. The browsing monitor 116 continually records web browsing history at the level of interactions, such as entering a value into a form field, turning on a checkbox, or clicking a button. This goes beyond a conventional web history interface to give the user a more complete picture of the actions performed on every web page that is visited, as compared to just recording page titles and URLs. The information recorded by the browsing monitor 116 is stored as the browsing history information 124. The illustrated embodiment uses the method for recording such a browsing history that is described in Ian Li et al. "Here's what I did: sharing and reusing web activity with ActionShot" (CHI 2010: Proceedings of the 28th international conference on Human factors in computing systems, 2010, pp. 723-732), which is herein incorporated by reference in its entirety. Other methods for recording a user's web browsing history are used in further embodiments of the present invention.

Figure 2:
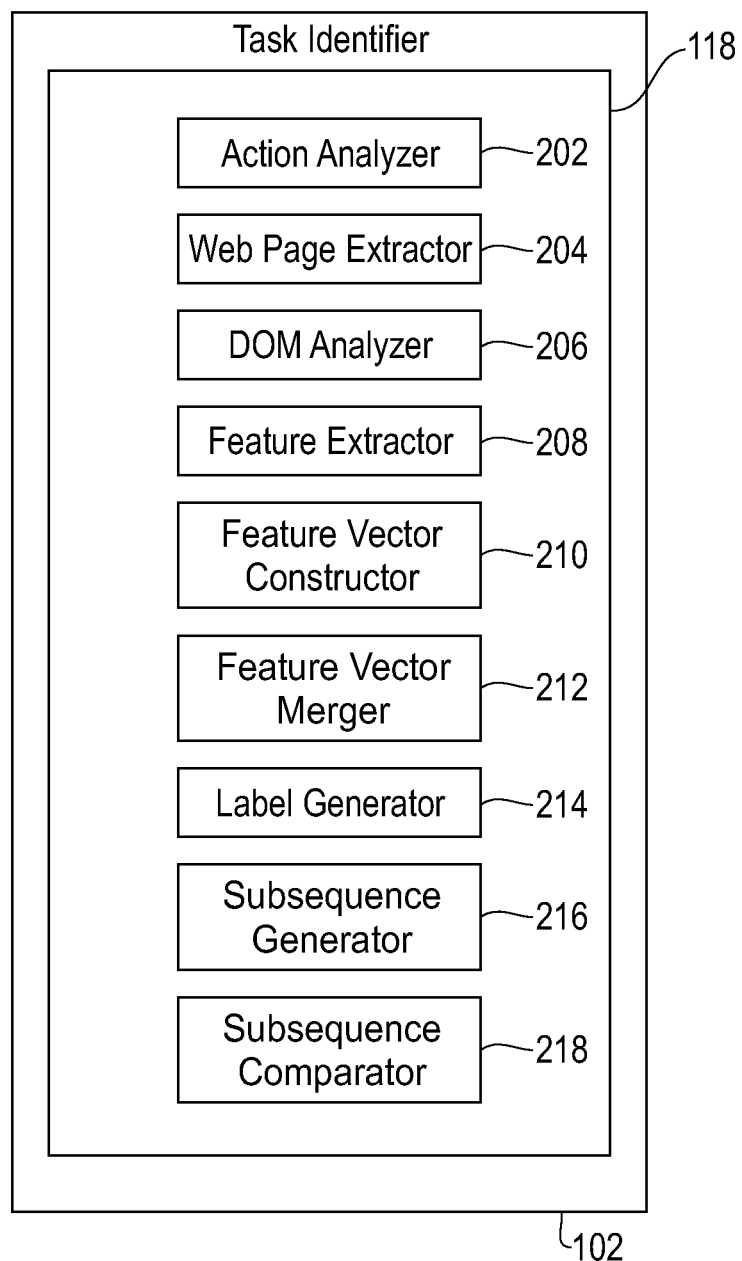
FIG. 2 is a block diagram illustrating a more detailed view of the task identifier of FIG. 1.

The task identifier 118 comprises an action analyzer 202, a web page extractor 204, a DOM analyzer 206, a feature extractor 208, a feature vector constructor 210, a feature vector merger 212, a label generator 214, a subsequence generator 216, and a subsequence comparator 218, as shown in FIG. 2. The task identifier 118 uses these components to automatically identify personalized tasks for the user from the web browsing interaction history 124. More specifically, the task identifier 118 identifies repeated sequences of similar actions on a single website from the user's web browsing interaction history 124 and web pages (and DOMs) 126 associated with each action. These sequences are labeled as a task (i.e., web browsing task). For example, the task identifier 118 identifies the following sequence of web actions as a task.

visiting the website "www.abc.com"
clicking the link "tv"
clicking the link "lcd tv"
clicking the link "brand1 lcd"
clicking the button "add to shopping cart"
clicking the "check out" button Task models 128 are created for each task. The task models 128 identify other instances of the task from web interactions on the same website or other websites. The script generator 122 uses these identified tasks to generate task-scripts that can be automatically performed at the website(s). More specifically, after the task is identified, the script generator 122 uses the identified task to generate a script for the actions. The script is a sequence of instructions, with each instruction corresponding to an action. For example, the following script is generated for the exemplary sequence of web actions listed.

go to "www.abc.com"
click the "tv" link
click the "lcd tv" link
click the "brand1 lcd" link
click the "add to shopping cart" button
click the "check out" button The illustrated embodiment uses the script generator that is described in Gilly Leshed et al. "CoScripter: automating & sharing how-to knowledge in the enterprise". Other script generators are used in further embodiments of the present invention.

Identifying personalized tasks from a user's web browsing interaction history enables automatic creation of task specific scripts for later execution by a web automaton tool. Such scripts can later be reused by the same user or by other users. Also, a user can easily bootstrap their personalized task-script repository to have the full benefit of existing web automaton systems. Even further, task inference from a user's web browsing interaction history 124 can be used in creating a user's personal profile. For example, keywords identified from the personalized task scripts can be added to a user's interest profile. For example, if the keywords "book" and "buy" are identified from a user's task script, then those can be added to user's interest profile. This can also be used to categorize the user as a frequent book buyer. Thus, task inference can assist the building of a task-based profile for the user, which can be used by adaptive and context-aware systems, social networking applications, and mobile applications.

Figure 3:
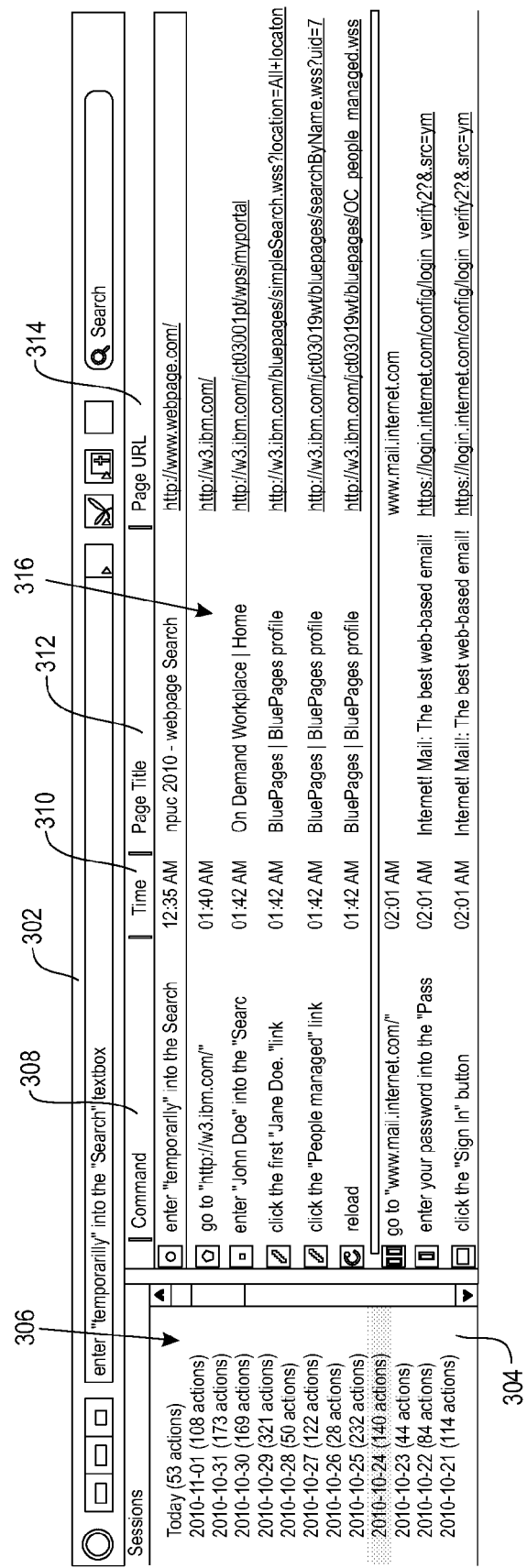
FIG. 3 shows an exemplary web browsing interaction history that is used in one embodiment of the present invention.

The following is a more detailed discussion on generating scripts from tasks that are identified from repeated action sequences. To identify tasks from a user's web interaction history 124, the action analyzer 202 analyzes the interaction history 124. FIG. 3 shows an exemplary web browsing interaction history that is used in one embodiment of the present invention. A user interface 302 displays the user's web browsing interaction history. In this embodiment, web browsing session information 304 is displayed in a first area 306 of the user interface 302. Actions 308 performed at a web page of a website, time information 310, web page title information 312, and web page URL information 314 are displayed in a second area 316 of the interface 302. Other types of information can also be maintained and displayed in the web browsing interaction history 124.

Figure 4:
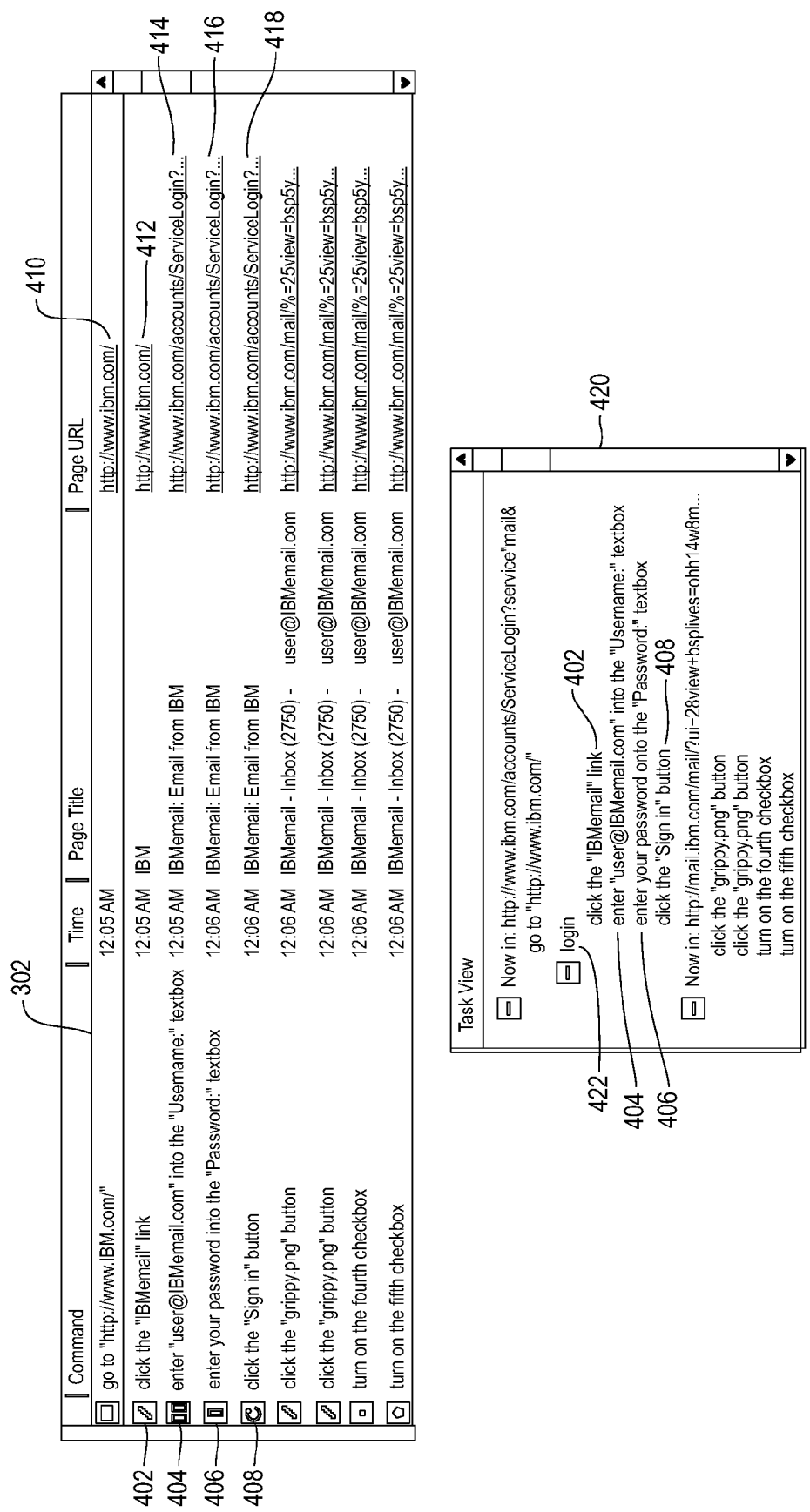
FIG. 4 illustrates the segmenting of web browsing actions based on tasks according to one embodiment of the present invention.

In this embodiment, the task identifier 118 segments the interaction history 124 by websites and sessions. FIG. 4 illustrates the segmentation of web browsing actions based on tasks in this embodiment. The exemplary segmented interaction history 124 includes the following sequence of actions: clicking on a "IBMemail" link 402, entering a user name 404, entering a password 406, and clicking a sign in button 408. After such segmentation, there are one or more sequences of actions for each website.

For each action in each sequence of actions $S_j$ for each website $W_i$ identified in the interaction history 124, the following is performed by the task identifier 118.

(1) The task identifier 118, via the web page extractor 204, extracts an associated web page 126 for each action. These web pages 126 are extracted from the user's web browsing history 124. For example, for the actions 402, 404, 406, and 408 shown in FIG. 4, the corresponding web pages 410, 412, 414, 416, and 418 are respectively extracted. Each such web page has a DOM that is used for further analysis.

(2) For each action, the task identifier 118, via the DOM analyzer 206, also identifies the node for the web object (e.g., the "sign in" link) that was accessed during the web action from the DOM of the web page 126. In this embodiment, an x-path expression for each web object is present in the web browsing history 124. This makes the retrieval of the node corresponding to the web object straightforward. The identified node is referred to as an "action node". In an alternative embodiment, the DOM analyzer 206 searches the DOM to find the node that has a matching object type (e.g., link) and a matching object label (e.g., "lord of the rings").

(3) After the action node for each web object is identified from the extracted web pages 126, the task identifier 118, via the feature extractor 208, extracts features from the action node and surrounding nodes that share similar textual context (i.e., context nodes). In this embodiment, the extracted features for each action node are words, phrases (bi-grams and tri-grams), and object type (e.g., button), and the extracted features for context nodes are words and phrases (bi-grams and tri-grams). The illustrated embodiment performs contextual analysis for web browsing according to the method in Jalal Mahmud et al. "Csurf: a context-driven non-visual web-browser" (WWW '07: Proceedings of the 16th international conference on World Wide Web, 2007, pp. 31-40), which is herein incorporated by reference in its entirety (4) After features are extracted, the task identifier 118, via the feature vector constructor 210, constructs a feature vector for each action. For example, if the action is "click the 'check out' button", and from the context of the 'ok' button, the following text is extracted {shipping, delivery}. Then, the feature vector is <click, button, ok, shipping, delivery>.

(5) After the feature vector is constructed for each action in each sequence for a website, the task identifier 118 performs a clustering process that merges similar feature vectors into a single cluster. For example, the two feature vectors <click, button, sign, in> and <click, button, sign, in, now> are merged into a single cluster. Similarly, the two feature vectors <click, radiobutton, check, out, now> and <turn, on, radiobutton, check, out> are merged into the same cluster. For the similarity computation required by the clustering process, cosine similarity of vectors is used in this embodiment. Each cluster serves as a feature vector class which is used as a classifier in the categorizing of the feature vectors. The task identifier 118, via the label generator 214, generates and assigns an action-class label (i.e., "feature-vector class label") to each of the clusters.

After the clustering process has completed, the task identifier 118 replaces each action (such as action 402) with its associated feature-vector class label and generates a sequence of feature-vector class labels for each action sequence. Therefore, for each sequence $S_j$ for each website $W_i$, an abstracted sequence $F(S_j)$ is generated with each action $a_k$ in the sequence being replaced with $F(a_k)$, where $F(a_k)=I_k$ is the label of the feature-vector class of action $a_k$. If the length of the abstracted sequence $F(S_j)$ is m, then the task identifier 118, via the subsequence generator 216, generates the following m subsequences.

$I_1$ $I_1 I_2$ $I_1 I_2 I_3$

...

$I_1 I_2 I_3 \ldots I_m$

After the subsequences have been generated for each abstracted sequence for the website, the task identifier 118, via the subsequence comparator 218, computes a similarity characteristic of the subsequences and identifies repeating subsequences based on this similarity. Each repeating subsequence that is identified is an "identified task". The similarity computation of subsequences considers two subsequences as similar if: (1) they are identical (i.e., they are the same sequences of feature-vector class labels), or (2) one of the subsequences is a generalization of the other. In this embodiment, the following heuristic is used to determine generalization, with p being the prefix, m being the middle part, and s being the suffix.

A subsequence $pm^+s$ is a generalization of the subsequence pmms.

These generalization heuristics are based on the observation that if a sequence of actions completes a task, then adding subsequences of repeated actions also completes the task. For example, consider the following two subsequences of actions for the website "abc.com".

Subsequence 1:
visiting the website www.abc.com
clicking the link "tv"
clicking the link "lcd tv"
clicking the link "brand1 lcd tv"
clicking the button "add to shopping cart"
clicking the link "view shopping cart"
clicking the "check out" button
Subsequence 2:
visiting the website www.abc.com
clicking the link "tv"
clicking the link "plasma tv"
clicking the link "brand2 plasma tv"
clicking the button "add to cart"
clicking the "check out" button After clustering of the feature vectors for the actions in these subsequences, the following abstracted sequences are obtained.

Abstracted Sequence 1: $I_1$ $I_2$ $I_3$ $I_4$ $I_5$ $I_5$ $I_6$
Abstracted Sequence 2: $I_1$ $I_2$ $I_3$ $I_4$ $I_5$ $I_6$ In this example, the third actions of both subsequences are put into the same cluster because they share similar words in the action node as well as in their context. The fourth actions are also clustered together because of contextual similarity. These two abstracted sequences are considered to be equal because the first is a generalization of the second. As a result, these are identified as sequences corresponding to a task. Once a sequence of actions is identified as an instance of a task, the script generator 122 can generate executable scripts from the action sequences corresponding to the tasks. These action sequences that are identified as a task can also be displayed to the user via another portion 420 of the user interface 302, as shown in FIG. 4. This "task view" shows to the user a given task 422 (such as "login") and the associated activities 402, 404, 406, and 408 that have been identified as an instance of this task 422.

After the task sequences are identified, the task model generator 120 constructs a task model 128 for each of the identified tasks. The model 128 comprises all of the identified action sequences that are an instance of this task and is used to identify future sequences of actions as an instance of this task. The model 128 also comprises feature classifiers that classify the features extracted from the user's actions into an abstracted action, and the generalization heuristics are used to compute the similarity of abstracted action sequences. An exemplary task model 128 for the two sequences above is the following two action sequences (listed with their scripts).

Action Sequence 1:
Script
visiting the website www.abc.com
   go to "www.abc.com"
clicking the link "tv"
   click the "tv" link
clicking the link "lcd tv"
   click the "lcd tv" link
clicking the link "brand1 lcd tv"
   click the "brand1 lcd tv" link
clicking the button "add to shopping cart"
   click the "add to shopping cart" button
clicking the link "view shopping cart"
   click the "view shopping cart" link
clicking the "check out" button
   click the "check out" button Action Sequence 2:
Script
visiting the website www.abc.com
   go to "www.abc.com"
clicking the link "tv"
   click the "tv" link
clicking the link "plasma tv"
   click the "plasma tv" link
clicking the link "brand2 plasma tv"
   click the "brand2 plasma tv" link
clicking the button "add to cart"
   click the "add to cart" button
clicking the "check out" button
   click the "check out" button The feature classifier classifies the actions for this task model into a set of clusters that each correspond to an action-class label. In particular, the feature classifier places an action (i.e., interaction on a web page element) into a cluster that classifies the action as an abstracted-action with a corresponding action-class label. For the above example, the feature classifier places the actions into six clusters. After classification, the following two abstracted sequences are obtained from the two action sequences.

Abstracted Sequence 1: $I_1\ I_2\ I_3\ I_4\ I_5\ I_5\ I_6$
Abstracted Sequence 2: $I_1\ I_2\ I_3\ I_4\ I_5\ I_6$ The generalization heuristics for this task model are:
a) a subsequence $pm^+s$ is a generalization of the subsequence $pmms$;
b) a subsequence $pm(ym)^+s$ is a generalization of the subsequence $pmyms$; and
c) a subsequence $p(my)^+ms$ is generalization of the subsequence $pmyms$.

This process for identifying action sequences associated with a task is used to determine whether or not new action sequences are instances of a task based on the task models 128. A website specific task model constructed for a website helps identify new action sequences as instances of that task. This facilitates generating scripts for new action sequences. In this way, a user can bootstrap their personalized script repository.

For example, to identify whether a sequence of actions that is not currently identified as an instance of a given task is an instance of a given task, the following is preformed. First, the task identifier 118 applies the feature extraction technique described above to the identified sequence of actions to generate a feature vector for each action in the sequence. The task model generator 120 then classifies the feature vectors using the feature vector class labels that were constructed as a result of the clustering performed to construct task models, as described above. If a feature vector is not mapped/classified to any of the clusters, then the task identifier 118 creates a new cluster for it. After this is done, the task identifier 118 generates an abstracted sequence from the action sequence by replacing each action with its feature vector cluster label. Next, the task identifier 118 computes its similarity with the sequences stored in the task models 128. To determine whether two sequences are similar, the generalization heuristics described above are used. A sequence is identified as an instance of a task if the sequence is found to be similar to any of the sequences stored in the associated task model 128. In some instances, a sequence may be identified as an instance of multiple tasks. After a sequence of actions is identified as an instance of a task, the script generator 122 can generate executable scripts from the action sequences corresponding to the task.

In addition, the task models can be built across websites and across multiple users so that test cases can be automatically generated for testing web sites. A detailed discussion on testing websites is given in Jeffrey Bigham et al. "Trail-Blazer: Enabling Blind Users to Blaze Trails Through the Web" (IUI '09: Proceedings of the 13th international conference on Intelligent user interfaces, 2009, pp. 177-186), which is herein incorporated by reference in its entirety.

After a tester has task models for each task (across multiple websites in the similar domain and across multiple users), and a user's browsing history for the website for which test cases are to be developed, the tester can use task models to identify task-specific actions from the browsing history and generate scripts from them automatically. Thus, the burden of manual test script generation is avoided.

The task models 128 also help a website tester that uses the task models constructed from multiple websites. If the tester does not have the browsing history of a user for the website for which they want to automatically generate test cases, the tester can still use task models to automatically construct scripts from the website.

In one embodiment, the following is performed for each task model to construct the script for a website. The task management system 115 loads the home page of the website. Then for each actionable element of the current web-page, the task management system 115 obtains the features and classifies the features with the feature labels for that task model. The actionable elements that are classified to some action-class for that task model form candidate sets of relevant actionable elements on the web-page. An abstracted subsequence of actions is constructed for each of these candidate sets of relevant actionable elements. For example, assume that the website for which a tester wants to construct a task model is "www.xyz.com" and the following links are classified as an instance of action-class: "lcd tv" link, "flat screen tv" link, and "plasma tv and others" link.

The action class for the first two links is I2 and the last link is I3, and the abstracted action-class label I1 corresponds to the action of visiting the website of "xyz.com". So the abstracted subsequence constructed is I1.I2 for the first link; I1.I2 for the second link; and I1.I3 for the third link. The current abstracted subsequences are compared to the abstracted sequences stored in the task model to determine if the current abstracted subsequences are a prefix of any of the abstracted subsequences in the task model. The prefix comparison also uses generalization heuristics.

For illustration, the first two abstracted subsequences are prefixes of the following abstracted sequence: I1 I2 I3 I4 I5 I5 I6. Therefore, both links are selected. The task management system 115 then follows the first link, loads the corresponding page, and uses the algorithm discussed above to synthesize scripts. Next, the task management system 115 follows the second link, loads the next page and uses the above algorithm to synthesize scripts. In this example, once the first link is selected, the task management system 115 can generate the scripts that correspond to the following abstracted sequences: I1 I2 I2 I3 I4 I5 I6, and I1 I2 I3 I3 I4 I4 I3 I4 I5 I6. Once the second link is selected, the task management system 115 can generate the scripts that correspond to the following abstracted sequence I1 I2 I3 I4 I3 I4 I5 I6. An example of script fragments generated for the abstracted sequences of I1 I2 I2 I3 I4 I5 I6, and I1 I2 I3 I3 I4 I4 I3 I4 I5 I is shown in TABLE 1 below.

TABLE 1

| For Abstracted Sequence 1 | For Abstracted Sequence 2 |
|---|---|
| go to "xyz.com" | go to "xyz.com" |
| click the "lcd tv link" | click the "flat screen tv link" |
| ... | ... |
| ... | ... |

Thus, personalized tasks are automatically identified from a user's web browsing interaction history. Repeated sequences of similar actions on a single website are identified from the user's web browsing interaction history. These sequences are labeled as a task, which assists in the creation of task-scripts by web automaton systems and lowers the barrier to task-script generation.

Figure 5:
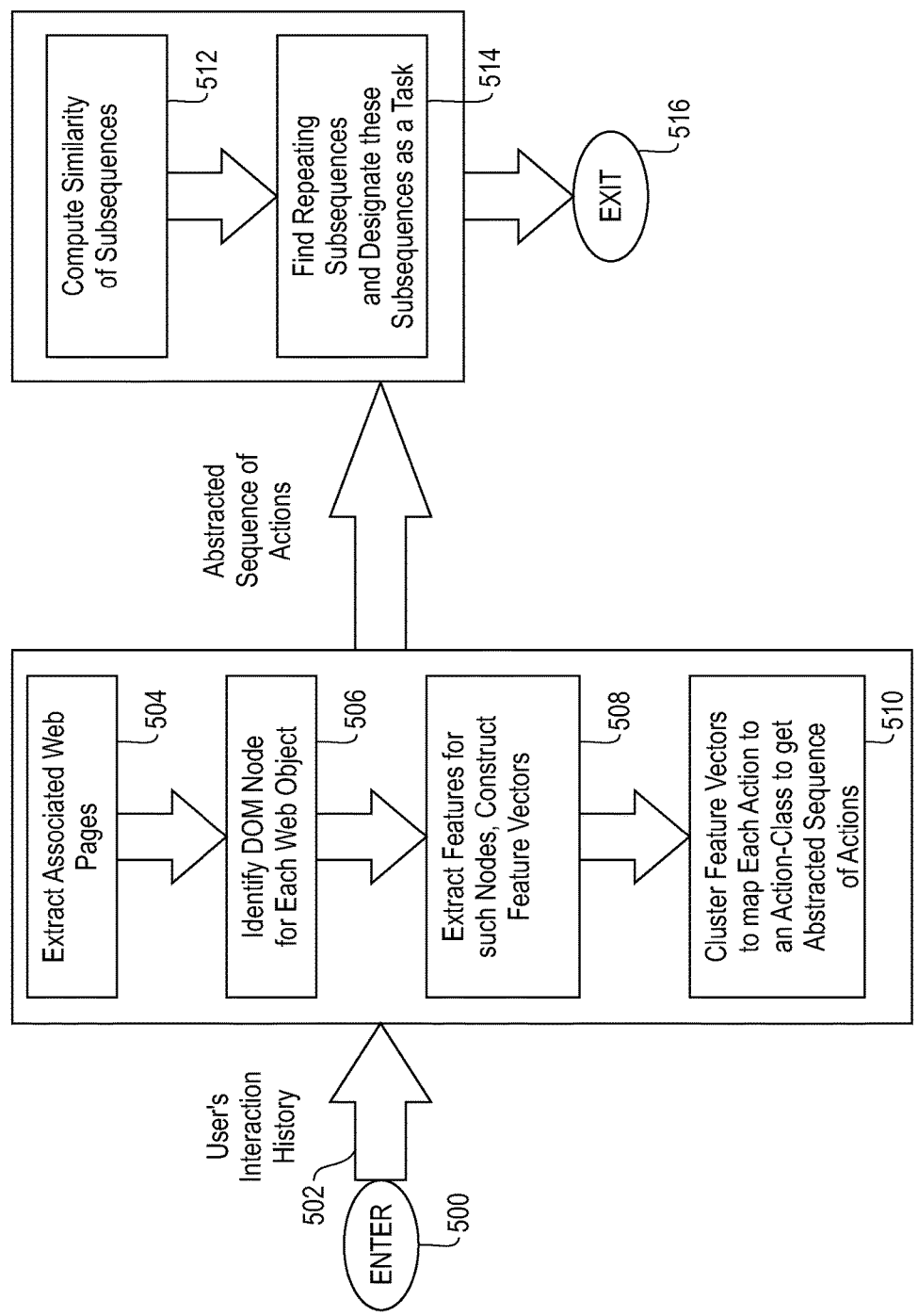
FIG. 5 is an operational flow diagram for identifying web browsing tasks based on repeated web browsing actions according to one embodiment of the present invention.

FIG. 5 is an operational flow diagram illustrating a process for identifying tasks based on repeated action sequences according to one embodiment of the present invention. The operational flow diagram of FIG. 5 begins at step 500 and flows directly to step 502. The task management system 115 receives a user's web browsing interaction history 124, at step 502. The task management system 115 extracts web pages 126 associated with actions identified in the interaction history 124, at step 504.

The task management system 115 identifies, for each identified action, a DOM node for each web object accessed during the action, at step 506. The task management system 115 extracts features associated with each node and constructs features vectors for the actions, at step 508. The task management system 115 clusters the feature vectors to map each action to an action-class in order to obtain an abstracted sequence of actions, at step 510. The task management system 115 computes a set of action subsequences for each abstracted sequence of actions and determines the similarity of the action subsequences, at step 512. The task management system 115 then identifies repeating action sequences and designates these repeating sequences as a task, at step 514. The control flow then exits at step 516.

Figure 6:
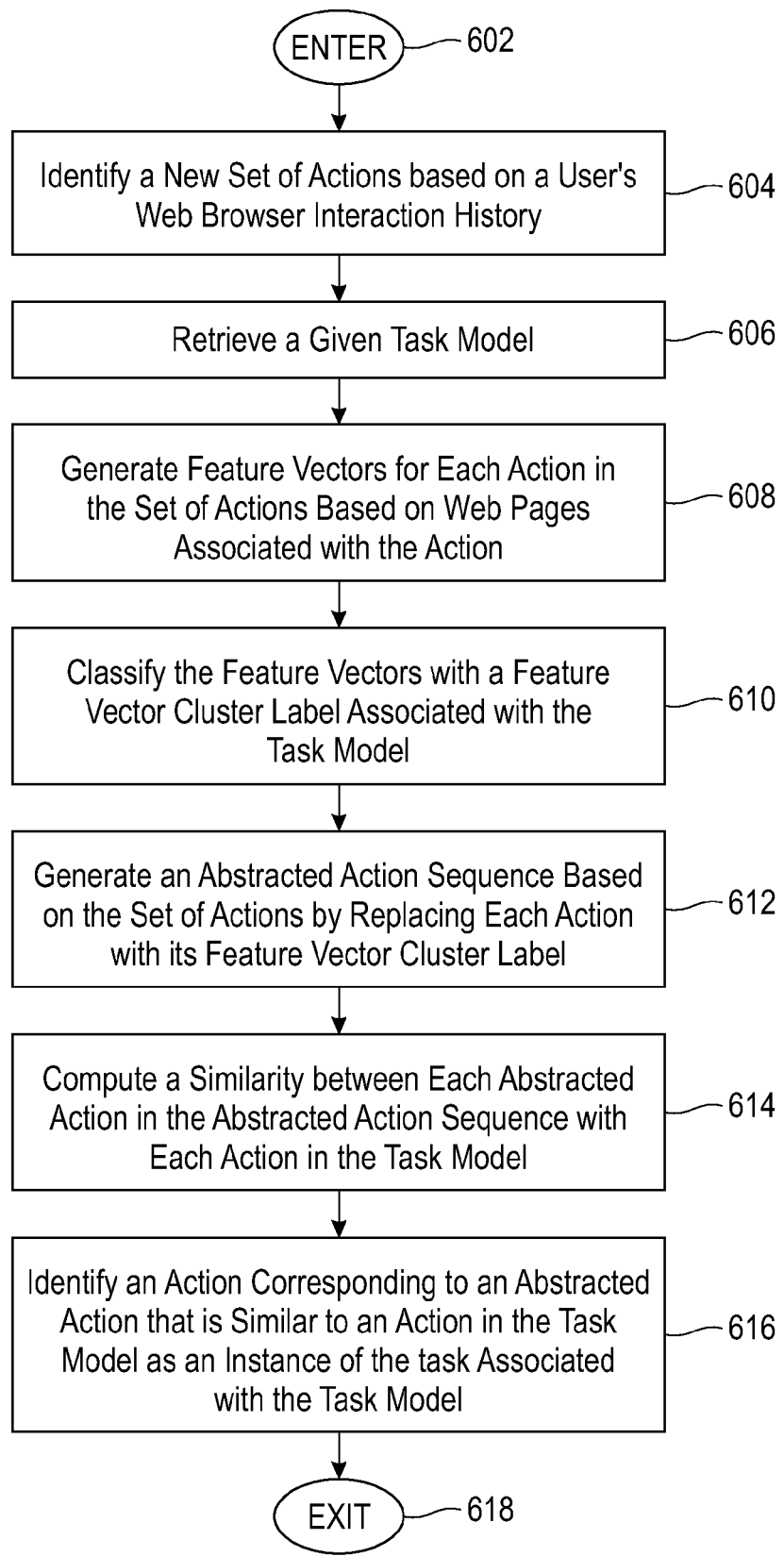
FIG. 6 is an operational flow diagram for identifying new action sequences as an instance of an existing task based on a task model according to one embodiment of the present invention.

FIG. 6 is an operational flow diagram illustrating a process for determining if new action sequences are an instance of an existing task based on a task model according to one embodiment of the present invention. The operational flow diagram of FIG. 6 begins at step 602 and flows directly to step 604. The task management system 115 identifies a new set of actions based on a user's web browser interaction history 124, at step 604. The task management system 115 retrieves one or more task models 128, at step 606. The task management system 115 generates feature vectors for each action in the set of actions based on web pages 126 associated with the action, at step 608.

The task management system 115 classifies the feature vectors using feature vector cluster labels associated with the task model 128, at step 610. The task management system 115 generates an abstracted action sequence based on the set of actions by replacing each action with its feature vector cluster label, at step 612. The task management system 115 computes a similarity between each abstracted action and each action in the task model 128, at step 614. The task management system 115 identifies an action corresponding to an abstracted action that is similar to an action in the task model 128 as an instance of the task associated with the task model 128, at step 616. The control flow then exits at step 618.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
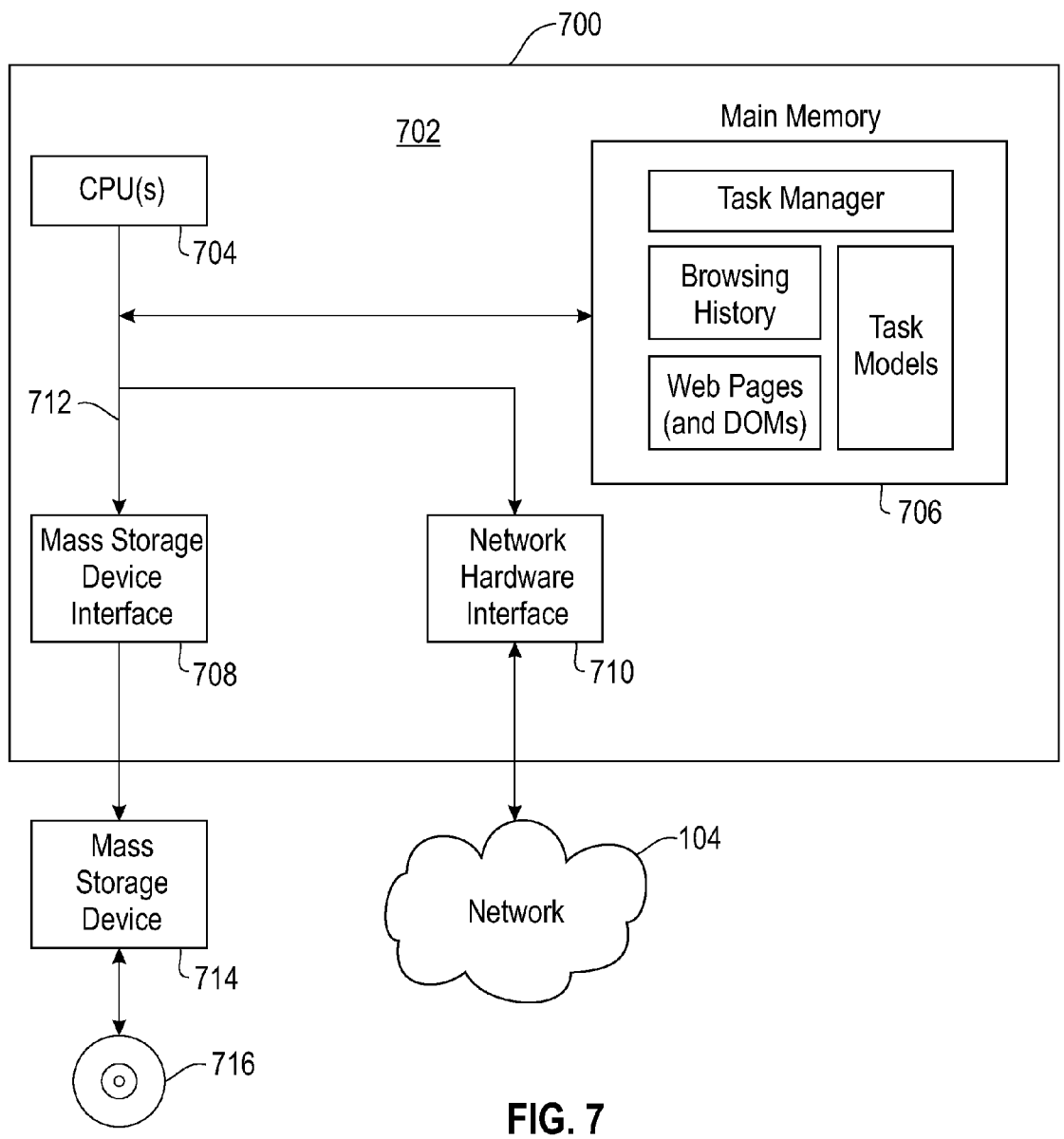
FIG. 7 is a block diagram illustrating an information processing system applicable to embodiments of the present invention.

Referring now to FIG. 7, this figure is a block diagram illustrating an information processing system that can be utilized in embodiments of the present invention. The information processing system 700 is based upon a suitably configured processing system adapted to implement one or more embodiments of the present invention (e.g., the user system 102 of FIG. 1). Any suitably configured processing system can be used as the information processing system 700 in embodiments of the present invention.

The information processing system 700 includes a computer 702. The computer 702 has a processor(s) 704 that is connected to a main memory 706, mass storage interface 708, and network adapter hardware 710. A system bus 712 interconnects these system components. Although only one CPU 704 is illustrated for computer 702, computer systems with multiple CPUs can be used equally effectively. The main memory 706, in this embodiment, comprises the task manager 115 and its components, the browsing interaction history 124, the web pages 126, and the task models 128.

The mass storage interface 708 is used to connect mass storage devices, such as mass storage device 714, to the information processing system 700. One specific type of data storage device is an optical drive such as a CD/DVD drive, which can be used to store data to and read data from a computer readable medium or storage product such as (but not limited to) a CD/DVD 716. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 700. The network adapter hardware 710 is used to provide an interface to a network 104. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A method comprising:
analyzing a web browsing interaction history of a user to identify a plurality of web browsing actions previously performed by the user at one or more web sites;
generating a plurality of abstracted action sequences for a sequence of web browsing actions in the plurality of web browsing actions for at least one website of the one or more websites, wherein generating the plurality of abstracted sequences comprises
constructing a feature vector for each of the plurality of web browsing actions identified for the at least one website, wherein the feature vector at least identifies a web content element and an action performed on the web content element;

generating, for the website, a plurality of action subsequences for the abstracted action sequences, wherein generating the plurality of action subsequences comprises organizing each abstracted sequence in the plurality of abstracted sequences into one of a plurality of clusters based on the feature vector constructed for the abstracted sequence, wherein each cluster in the plurality of clusters represents a different feature vector class and is associated with an action-class label identifying the feature vector class, replacing each abstracted sequence in the plurality of abstracted sequences with the action-class label of the cluster corresponding to the abstracted sequence, and generating the plurality of action subsequences based on each action-class label representing each abstracted sequence in the plurality of abstracted sequences, wherein each action subsequence in the plurality of action subsequences comprises an increasing number of action-class labels representing an abstracted sequence;

determining a similarity between each of the action subsequences in the plurality of action subsequences;

designating, based on the similarity that has been determined, similar action subsequences in the plurality of action subsequences as a web browsing task previously accomplished by the user at the web site, wherein the web browsing task is composed of at least one sequence of actions previously performed by the user at the web site to accomplish a goal, and wherein at least one action in the at least one sequence of actions is performed on at least one web content element of the web site; and automatically generating a set of executable scripts based on the similar action subsequences designated as the web browsing task, where web browsing actions utilized to generate the set of executable scripts are web browsing actions only from the web browsing interaction history, and wherein the set of executable scripts automatically accomplishes the web browsing task at one or more websites without requiring the user to perform an initial action at the one or more websites.

2. The method of claim 1, wherein generating the plurality of abstracted action sequences further comprises, for each web browsing in the sequence of web browsing actions:

extracting a web page on which the web browsing action was performed;

analyzing a document object model associated with the web page that is extracted; and identifying a node in the document object model for a web object accessed by the web browsing action.

3. The method of claim 2, wherein generating the plurality of abstracted action sequences further comprises, for each node that is identified:

extracting a first set of features from the node; and extracting a second set of features from contextual nodes that have substantially similar textual content as the node.

4. The method of claim 3, wherein each of the feature vectors are constructed based on the first set of features and the second set of features that are extracted.

5. The method of claim 1, wherein determining the similarity between each of the action subsequences comprises:

determining if one of the action subsequences comprises substantially identical sequences of action-class labels as one or more other of the action subsequences; and determining if the one action subsequence is a generalization of the one or more other action subsequences.

6. The method of claim 1, further comprising:

generating a web browsing task model based on the similar action subsequences designated as the web browsing task, the web browsing task model comprising the similar action subsequences, a plurality of feature classifiers that classify features associated with each of the web browsing actions in the similar action subsequences, and a plurality of generalization heuristics that compute similarity of abstracted action sequences.

7. The method of claim 6, further comprising:

identifying a set of web browsing actions from the web browsing interaction history;

comparing the set of web browsing actions to the similar action subsequences in the web browsing task model; and designating the set of web browsing actions as an instance of the web browsing task if the set of web browsing actions is substantially similar to the similar action subsequences in the web browsing task model.

8. A computer program product comprising a non-transitory computer readable storage medium having computer readable program code embodied therewith, the computer readable program code comprising:

computer readable program code configured to:

analyze a web browsing interaction history of a user to identify a plurality of web browsing actions previously performed by the user at one or more web sites;

generate a plurality of abstracted action sequences for a sequence of web browsing actions in the plurality of web browsing actions for at least one website of the one or more websites, wherein the computer readable program code is configured to generate the plurality of abstracted sequences by at least constructing a feature vector for each of the plurality of web browsing actions identified for the at least one website, wherein the feature vector at least identifies a web content element and an action performed on the web content element;

generate, for the web site, a plurality of action subsequences for the abstracted action sequences, wherein the computer readable program code is configured to generate the plurality of action subsequences by organizing each abstracted sequence in the plurality of abstracted sequences into one of a plurality of clusters based on the feature vector constructed for the abstracted sequence, wherein each cluster in the plurality of clusters represents a different feature vector class and is associated with an action-class label identifying the feature vector class, replacing each abstracted sequence in the plurality of abstracted sequences with the action-class label of the cluster corresponding to the abstracted sequence, and generating the plurality of action subsequences based on each action-class label representing each abstracted sequence in the plurality of abstracted sequences, wherein each action subsequence in the plurality of action subsequences comprises an increasing number of action-class labels representing an abstracted sequence;

determine a similarity between each of the action subsequences in the plurality of action subsequences;

designate, based on the similarity that has been determined, similar action subsequences in the plurality of action subsequences as a web browsing task previously accomplished by the user at the web site, wherein the web browsing task is composed of at least one sequence of actions performed by the user at the web site to accomplish a goal, and wherein at least one action in the at least one sequence of actions is performed on at least one web content element of the web site; and automatically generate a set of executable scripts based on the similar action subsequences designated as the web browsing task, where web browsing actions utilized to generate the set of executable scripts are web browsing actions only from the web browsing interaction history, and wherein the set of executable scripts automatically accomplishes the web browsing task at one or more websites without requiring the user to perform an initial action at the one or more websites.

9. The non-transitory computer readable medium of claim 8, wherein generating the plurality of abstracted action sequences comprises, for each of the web browsing actions that is identified:

extracting a web page on which the web browsing action was performed;

analyzing a document object model associated with the web page that is extracted; and identifying a node in the document object model for a web object accessed by the web browsing action.

10. The non-transitory computer readable medium of claim 9, wherein generating the plurality of abstracted action sequences further comprises, for each node that is identified:

extracting a first set of features from the node; and extracting a second set of features from contextual nodes that have substantially similar textual content as the node.

11. The non-transitory computer readable medium of claim 10, wherein each of the feature vectors are constructed:

based on the first set of features and the second set of features that are extracted.

12. The non-transitory computer readable medium of claim 8, wherein the computer readable program code is further configured to:

generate a web browsing task model based on the similar action subsequences designated as the web browsing task, the web browsing task model comprising the similar action subsequences, a plurality of feature classifiers that classify features associated with each of the web browsing actions in the similar action subsequences, and a plurality of generalization heuristics that compute similarity of abstracted action sequences.

13. A system comprising:

at least one processor;

a memory storing a set of instructions that, when executed by the at least one processor, cause the at least one processor to:

generate a plurality of abstracted action sequences for a sequence of web browsing actions in the plurality of web browsing actions for at least one website of the one or more websites, wherein generating the plurality of abstracted sequences comprises construct a feature vector for each of the plurality of web browsing actions identified for the at least one website, wherein the feature vector at least identifies a web content element and an action performed on the web content element;

generate, for the website, a plurality of action subsequences for the abstracted action sequences, wherein generating the plurality of action subsequences comprises organize each abstracted sequence in the plurality of abstracted sequences into one of a plurality of clusters based on the feature vector constructed for the abstracted sequence, wherein each cluster in the plurality of clusters represents a different feature vector class and is associated with an action-class label identifying the feature vector class, replace each abstracted sequence in the plurality of abstracted sequences with the action-class label of the cluster corresponding to the abstracted sequence, and generate the plurality of action subsequences based on each action-class label representing each abstracted sequence in the plurality of abstracted sequences, wherein each action subsequence in the plurality of action subsequences comprises an increasing number of action-class labels representing an abstracted sequence;

determine a similarity between each of the action subsequences in the plurality of action subsequences;

designate, based on the similarity that has been determined, similar action subsequences in the plurality of action subsequences as a web browsing task previously accomplished by the user at the web site, wherein the web browsing task is composed of at least one sequence of actions previously performed by the user at the web site to accomplish a goal, and wherein at least one action in the at least one sequence of actions is performed on at least one web content element of the web site; and automatically generate a set of executable scripts based on the similar action subsequences designated as the web browsing task, where web browsing actions utilized to generate the set of executable scripts are web browsing actions only from the web browsing interaction history, and wherein the set of executable scripts automatically accomplishes the web browsing task at one or more websites without requiring the user to perform an initial action at the one or more websites.

14. The system of claim 13, wherein in generating the plurality of abstracted action sequences, the task manager, for each web browsing in the sequence of web browsing actions:

extracts a web page on which the web browsing action was performed;

analyzes a document object model associated with the web page that is extracted; and identifies a node in the document object model for a web object accessed by the web browsing action.

15. The system of claim 14, wherein in generating the plurality of abstracted action sequences, the task manager further, for each node that is identified:

extracts a first set of features from the node; and extracts a second set of features from contextual nodes that have substantially similar textual content as the node.

16. The system of claim 15, wherein the task manager constructs each of the feature vectors: based on the first set of features and the second set of features that are extracted.

17. The method of claim 8, wherein at least one action in the similar action subsequences indicates that the user interacted with at least one web content element at the one or more web sites.

* * * * *